(12) United States Patent
Hylands et al.

(10) Patent No.: US 8,910,487 B2
(45) Date of Patent: Dec. 16, 2014

(54) STORAGE TANK ASSEMBLY FOR CRYOGENIC LIQUIDS

(75) Inventors: Darryl William Hylands, Nottingham (GB); Aik Beng Lua, Loughborough (GB)

(73) Assignee: T. Baden Hardstaff Ltd. (GB)

( * ) Notice: Subject to any disclaimer, the term of this patent is extended or adjusted under 35 U.S.C. 154(b) by 1105 days.

(21) Appl. No.: 12/212,695

(22) Filed: Sep. 18, 2008

(65) Prior Publication Data

US 2009/0071174 A1  Mar. 19, 2009

(30) Foreign Application Priority Data

Sep. 18, 2007  (GB) .................................. 0718127.4

(51) Int. Cl.

| F17C 13/08 | (2006.01) |
|---|---|
| F17C 3/08 | (2006.01) |
| F17C 13/00 | (2006.01) |
| F28D 17/00 | (2006.01) |
| F17C 1/00 | (2006.01) |
| F17C 3/00 | (2006.01) |
| F17C 5/00 | (2006.01) |

(52) U.S. Cl.
CPC ............... *F17C 5/007* (2013.01); *F17C 13/084* (2013.01); *Y02E 60/321* (2013.01); *F17C 2201/0109* (2013.01); *F17C 2201/035* (2013.01); *F17C 2201/056* (2013.01); *F17C 2203/013* (2013.01); *F17C 2203/015* (2013.01); *F17C 2203/0341* (2013.01); *F17C 2203/0345* (2013.01); *F17C 2203/0391* (2013.01); *F17C 2203/0629* (2013.01); *F17C 2205/0146* (2013.01); *F17C 2205/0149* (2013.01); *F17C 2205/0332* (2013.01); *F17C 2205/0352* (2013.01); *F17C 2221/011* (2013.01); *F17C 2221/012* (2013.01); *F17C 2221/013* (2013.01); *F17C 2221/014* (2013.01); *F17C 2221/033* (2013.01); *F17C 2223/0161* (2013.01); *F17C 2223/047* (2013.01); *F17C 2225/0161* (2013.01); *F17C 2227/0107* (2013.01); *F17C 2250/0408* (2013.01); *F17C 2250/075* (2013.01); *F17C 2260/021* (2013.01); *F17C 2260/022* (2013.01); *F17C 2265/032* (2013.01); *F17C 2270/0171* (2013.01); *F17C 2270/0176* (2013.01); *F17C 2270/0178* (2013.01)
USPC ............... 62/53.2; 62/45.1; 62/50.7; 165/10; 220/560.03; 220/560.04; 220/560.11; 220/562

(58) Field of Classification Search
USPC ............... 62/45.1, 50.7; 220/560.03, 560.04, 220/560.11, 562
See application file for complete search history.

(56) References Cited

U.S. PATENT DOCUMENTS 2,764,873 A * 10/1956 Mooyaart ...................... 62/50.2
2,784,560 A    3/1957 Johnson, Jr.
(Continued)

FOREIGN PATENT DOCUMENTS

| GB | 830171 | 3/1960 |
|---|---|---|
| GB | 2 398 115 | 8/2004 |

(Continued)

*Primary Examiner* — Allen Flanigan
*Assistant Examiner* — Filip Zec
(74) *Attorney, Agent, or Firm* — Salter & Michaelson

(57) ABSTRACT

A storage tank assembly for storage of cryogenic liquids including a first outer tank and a second, inner tank, the first and second tanks being spaced apart from one another to form an insulation space therebetween. Each of the first and second tanks has a first end, and an opposite second end spaced apart from the first end, and a wall extending from the first end to the second end. The assembly further includes a pipe work system comprising a plurality of pipes and a first connector extending through the wall of the first tank, the pipe work being connectable to the first connector such that the pipe work is spaced apart from the wall of the first tank.

20 Claims, 5 Drawing Sheets

(56) References Cited

U.S. PATENT DOCUMENTS

| | | | |
|---|---|---|---|
| 2,863,297 A | 12/1958 | Johnston | |
| 2,912,830 A | 11/1959 | Coldren et al. | |
| 3,425,585 A * | 2/1969 | Latham | 220/560.1 |
| 3,602,003 A * | 8/1971 | Hampton | 62/48.2 |
| 3,733,838 A | 5/1973 | Delahunty | |
| 3,764,036 A * | 10/1973 | Dale et al. | 220/560.05 |
| 3,766,876 A * | 10/1973 | Cowles | 114/74 A |
| 4,129,146 A * | 12/1978 | Schuler | 137/587 |
| 4,496,073 A * | 1/1985 | Silver et al. | 220/560.11 |
| 4,625,753 A * | 12/1986 | Gustafson | 137/202 |
| 4,637,216 A | 1/1987 | Shenoy et al. | |
| 4,956,975 A * | 9/1990 | Gustafson | 62/50.7 |
| 5,228,295 A | 7/1993 | Gustafson | |
| 5,335,503 A | 8/1994 | Lee | |
| 5,386,699 A * | 2/1995 | Myers et al. | 62/613 |
| 5,386,845 A * | 2/1995 | Zink | 137/350 |
| 5,404,918 A * | 4/1995 | Gustafson | 141/1 |
| 5,651,473 A * | 7/1997 | Preston et al. | 220/560.1 |
| 5,906,100 A | 5/1999 | Caldwell et al. | |
| 5,960,633 A * | 10/1999 | Limbach | 62/45.1 |
| 6,086,833 A * | 7/2000 | Conners et al. | 422/292 |
| 6,128,908 A * | 10/2000 | Gustafson | 62/45.1 |
| 6,634,519 B2 * | 10/2003 | Pelloux-Gervais et al. | 220/560.1 |
| 7,036,322 B2 | 5/2006 | Noble et al. | |
| 2002/0085921 A1 | 7/2002 | Gram et al. | |
| 2005/0066666 A1 | 3/2005 | Hall et al. | |
| 2006/0048490 A1 * | 3/2006 | Carter | 55/420 |
| 2007/0228048 A1 * | 10/2007 | Immel et al. | 220/560.1 |

FOREIGN PATENT DOCUMENTS

| | | |
|---|---|---|
| KR | 100679459 | 2/2007 |
| WO | 0208659 | 1/2002 |
| WO | 2006062411 | 6/2006 |

* cited by examiner

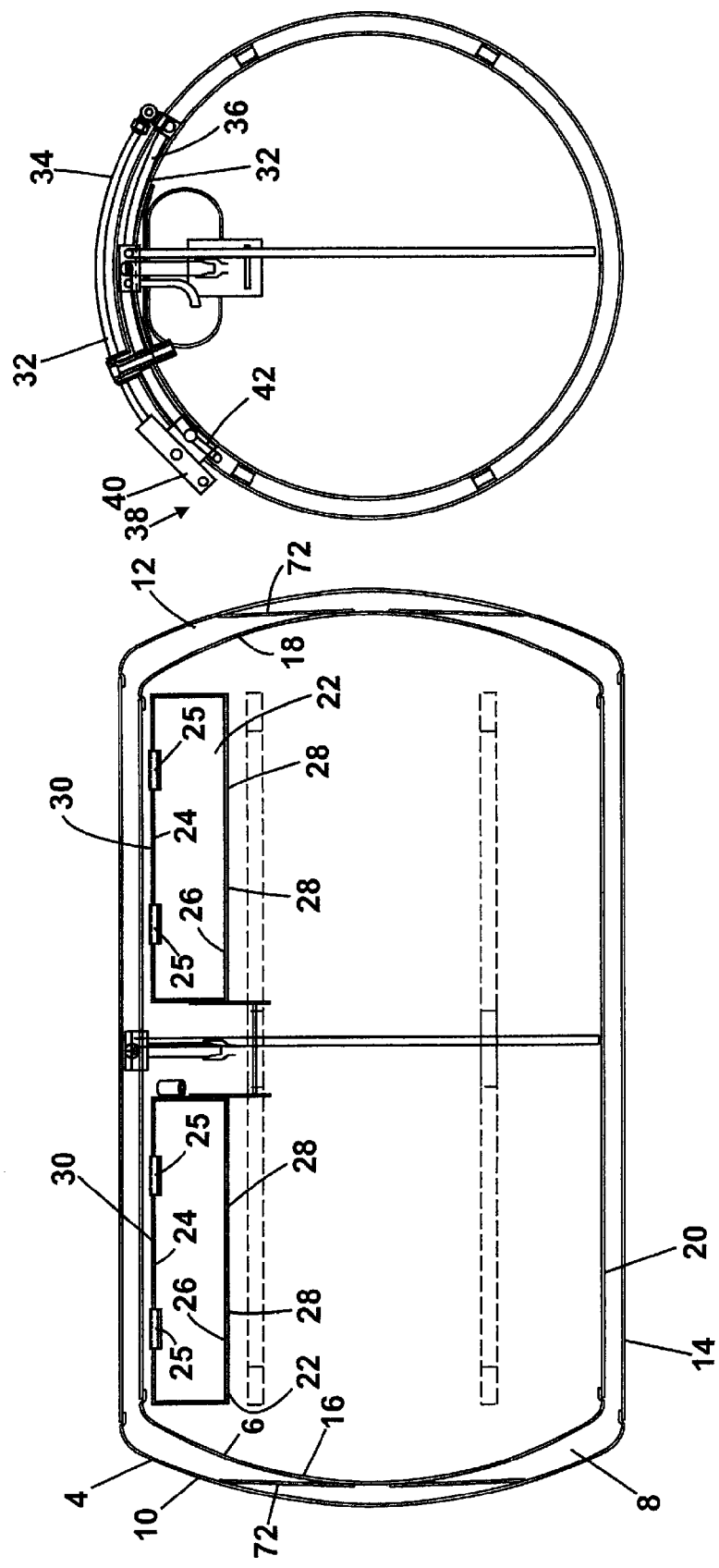

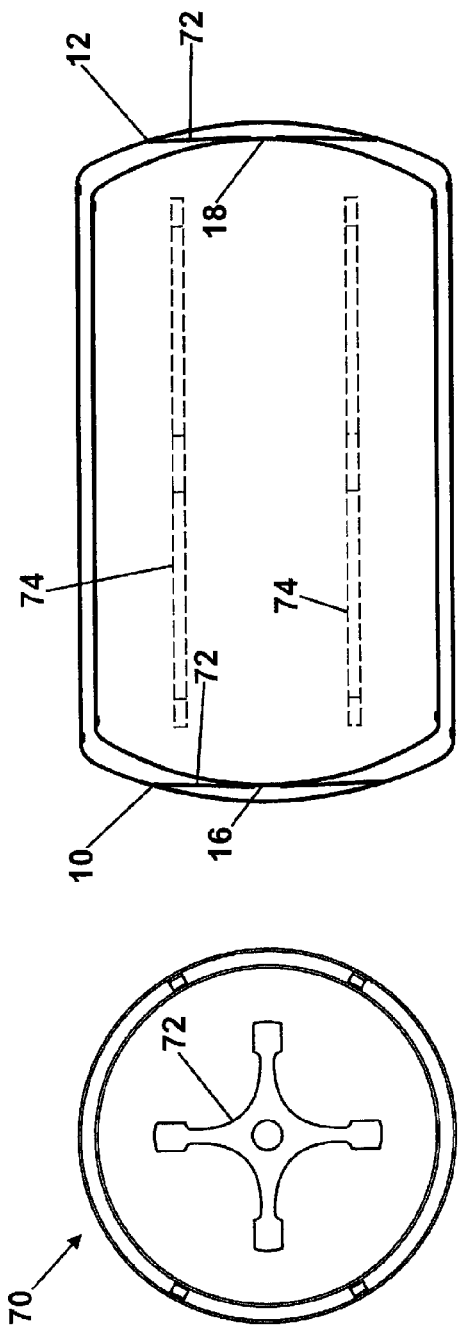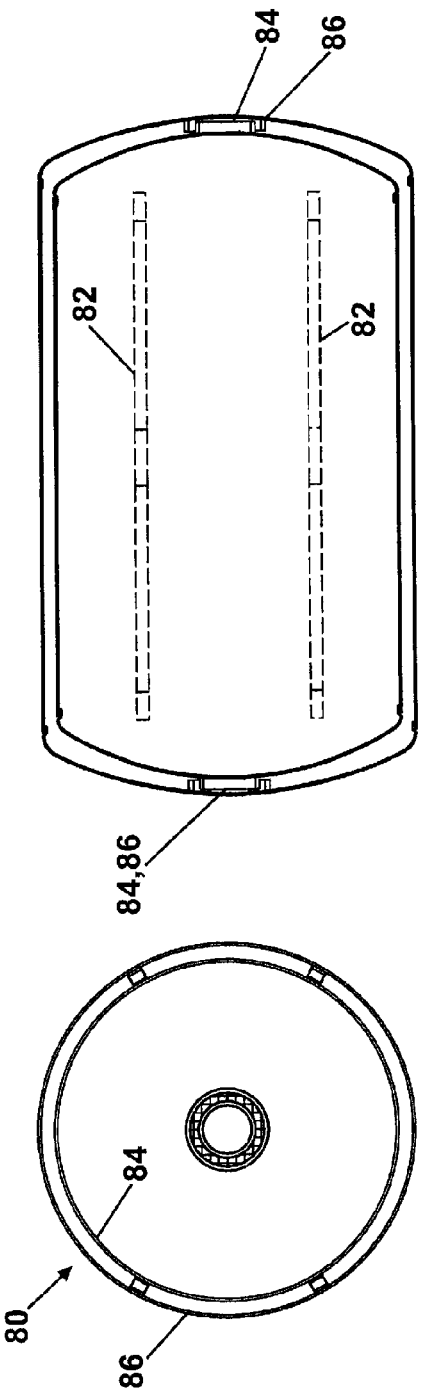

STORAGE TANK ASSEMBLY FOR CRYOGENIC LIQUIDS

TECHNICAL FIELD

This invention relates to a storage tank assembly for storage of cryogenic liquids, and particularly, but not exclusively to a storage tank assembly for the storage of liquid natural gas. The invention is not however limited to the storage of LNG, but could also be used for the storage of other cryogenic liquids, such as nitrogen, hydrogen, oxygen, carbon dioxide, methane and ethane.

BACKGROUND OF THE INVENTION

Whilst traditionally, vehicles particularly heavy goods vehicles have been powered by diesel, there is an ever increasing demand for vehicles that can run completely, or partially on alternative fuels such as liquefied natural gas (LNG). As this demand grows, there is a need to be able to efficiently store an alternative fuel such as LNG.

It is known to store a cryogenic liquid such as LNG in a double skinned vacuum insulated vessel. This helps to extend the "shelf life" of the LNG and maintains the LNG in a liquid form. LNG in its liquid form is in its most condensed state compared to a compressed gas and therefore takes up a minimum amount of space.

It is known to mount such a tank in a space which exists in the vehicle well between two of the wheels of a vehicle. There are therefore restrictions on the size and shape of a storage tank suitable for storing a cryogenic liquid that may be mounted on vehicles such as a heavy goods vehicles, buses, vans, cars, etc.

Existing cryogenic storage tanks for non-vehicular use are substantially cylindrical in shape and are generally designed to be mounted vertically, i.e., with the axis of the cylinder extending substantially vertically.

It is known to adapt such vertical storage tanks for use as vehicle storage tanks. However, due to the space available in vehicles, it is necessary to mount the storage tank so that the axis of the tank extends substantially horizontally in use. This leads to problems. For example, valves and pipes extending from a storage tank designed to be mounted vertically, extend generally through one end of the tank. This is disadvantageous when the tank is mounted horizontally on a vehicle, because the valves and pipes take up valuable space which could otherwise be used as part of the storage volume. In addition, due to the limited space available in the vehicle wheel well, access to the valves extending from the tank is also extremely limited.

Because it is necessary to allow sufficient space for the pipes and valves in order to allow access to these pipes and valves, the storage capacity of the tank must be reduced relative to the space available, in order that the tank assembly, including the pipes and vessels, can fit into the space available on the vehicle wheel well.

A further problem associated with existing storage tanks for storing cryogenic liquids is that cold tracking is possible through the neck of the vessel which leads to ice formation. This occurs because the inner vessel is generally fixed to the outer vessel at one end thus allowing the opposite end of the inner vessel to expand or contract relative to the outer vessel, as appropriate depending on the state of the cryogenic liquid within the tank. Cold tracking may therefore take place across points of contact between the inner vessel and the outer vessel.

Cold tracking is a term used to describe the effect of a thermal gradient between a cold surface and a warmer surface. This means that in the case of double skinned cryogenic storage tanks, at any point where there is contact between a cold surface and a warmer surface, the temperature of the warmer surface will be reduced due to cold tracking, which in turn results in the temperature within the tank increasing. This is disadvantageous because the temperature of the liquid stored in the cryogenic tank will rise as a result of the cold tracking, causing the liquid to vaporise. This leads to the pressure within the cryogenic tank increasing.

Another problem with existing storage tanks is that because tanks are generally designed to be mounted vertically but then are mounted horizontally for vehicular use, manifolds connecting pipework into and out of the storage tank may be submerged by cryogenic liquid during use of the tank. This is undesirable, as it increases cold tracking.

Another problem with existing storage tanks for storing cryogenics liquids is that is can be possible, under certain circumstances, to overfill the storage tank with the cryogenic liquid. This can lead to a build up of pressure within the tank, if, for example the liquid expands due to solar heat gain.

In order to prevent overfilling, it is known to use an ullage management system comprising one or more ullage chambers or tubular vessels which initially prevent liquid flowing into the storage tank from entering the interior of the ullage chamber or tubular vessel. This means that once the remainder of the tank, not including the volume defined by the ullage management system, is filled with the cryogenic liquid, a detector may indicate to a user that the tank is full. The user may then stop filling the tank with further cryogenic liquid.

The ullage management system allows the liquid to slowly enter the ullage chamber or vessel after the tank has been filled thus creating a volume in the inner tank that is empty, and that is therefore available for expansion should the temperature conditions within the tank result in the liquid expanding. This helps to prevent the pressure in the tank from increasing.

SUMMARY OF THE INVENTION

According to a first aspect of the present invention there is provided a storage tank assembly for storage of cryogenic liquids comprising a first outer tank and a second, inner tank, the first and second tanks being spaced apart from one another to form an insulation space, each of the first and second tanks having a first end, and an opposite second end spaced apart from the first end, and a wall extending from the first end to the second end, the assembly further comprising a first connector extending through the wall of the first tank for allowing connection of pipes to the tank assembly.

Because the connector is positioned on, and extends through, the wall of the first tank, rather than being positioned on an end of the first tank, it is more readily accessible when the tank is mounted horizontally on a vehicle.

In addition, because the connector extends through the wall of the first tank, rather than through either end of the first tank, the connector may be positioned, such that it is above the level of liquid held within the second tank during use of the tank. This helps to reduce cold tracking from the second tank via the connector.

Preferably, the first connector is positioned substantially midway between the first and second ends of the first tank.

This further increases the accessibility of the connector in use, and also means that the tank may be readily positioned on either side of a vehicle whilst still allowing accessibility to the first connector.

The connector may take any convenient form and may for example be a manifold allowing connection of plurality of pipes into either the first tank or the second tank.

Advantageously, the storage tank assembly comprises a plurality of pipes connectable directly or indirectly to the first connector, the plurality of pipes comprising a first pipe work system connectable to the first connector such that the first pipe work system is spaced apart from an outer surface of the wall of the first tank, and a second pipe work system connectable to the first connector such that the second pipework system is located in the insulating space, and spaced apart from an inner surface of the wall of the first tank, and an outer surface of the wall of the second tank.

Because both the first and second pipework systems are connectable to the first connector which is located on, and extends through the wall of the first, outer tank, the plurality of pipes and any associated operating systems such as values, will be easily accessible.

The pipe work is required in order to connect the storage tank assembly to a supply of cryogenic liquid in order that when it is required to fill the tank with the cryogenic liquid, liquid may be piped into the inner tank forming the storage tank assembly.

The pipe work also enables the cryogenic liquid stored in the tank to be withdrawn when required in order, for example to fuel a vehicle.

In addition, the pipe work allows exit of vapour which may be formed within the inner tank if, for example, the temperature within the inner tank increases, and then allows any vapour exiting the tank to re-enter the tank if appropriate.

Because the pipe work is spaced apart from the wall of the first tank, the possibility of cold tracking is reduced.

The pipes may be of any desirable diameter, and the spacing between the wall of the first tank and the wall of the second tank be adapted according to the size of the pipes in order to ensure that pipes do not come into contact with either the inner wall or the outer wall.

The first pipe work system thus allows connection between the storage tank assembly and external apparatus such as a fuel supply or a storage for liquid or vapour exiting the inner tank. The second pipe work system allows the inner tank to be connected to such external apparatus. Because the second pipe work system is spaced apart from an inner surface of the wall of the first tank, and an outer surface of the wall of the second tank, cold tracking which occurs at points of contact between surfaces, is reduced.

Advantageously, the storage tank assembly comprises a second connector extending through the wall of the second tank, the second pipe work system being connectable to the second connector and to the first connector.

The first and second connectors are thus in fluid communication with one another.

Preferably, the first connector extends through the wall of the first tank, but not the wall of the second tank, and is not in contact with the wall of the second tank.

Advantageously, the second connector extends through the wall of the second tank, but not through the wall of the first tank, and is not in contact with the wall of the first tank.

This arrangement helps to further reduce cold tracking from the second tank.

The second pipe work system thus extends between the first connector and the second connector allowing fluid communication between the first pipe work system, the second pipe work system and the second tank.

Because the plurality of pipes comprise two separate pipe work systems, it is possible to attach the second pipe work system to the inner tank before the inner tank is installed within the outer tank. The inner tank may thus be inserted through one end of the outer tank complete with the second pipe work system fitted to the wall of the inner tank.

In such an embodiment, the second pipe work system may be attached to second connector before the second pipe work system is attached to the inner tank. The second connector may then be inserted into the wall of the second tank such that the second pipe work system is positioned close to, but not in contact with, the wall of the second tank. The inner tank may then be inserted into the outer tank, and the second pipe work system may be connected to the first connector or another connector, in order to connect the second pipe work system to external pipes for example, through the wall of the outer tank.

Advantageously, the storage tank assembly comprises a plurality of first connectors. Conveniently, the storage tank assembly comprises a plurality of second connectors.

The plurality of first and/or second connectors allow for fluid connection between predetermined pipes of the first pipe work system and predetermined pipes of the second pipe work system. This may be advantageous if it is required that certain pipes, for example those enabling the pressure of the inner tank to be controlled, should be separate from other pipes fulfilling other functions.

Advantageously, the storage tank assembly comprises a cryogenic liquid delivery system comprising an eductor.

Preferably, the storage tank assembly further comprises an ullage vessel contained within the second tank and comprising a first aperture and an opposite second aperture, whereby, in use, the first aperture is located below the second aperture, and is larger than the second aperture.

Preferably, the first aperture is formed in a first, in use, lower face of the ullage vessel, and the second aperture is formed in a second, in use, upper face of the ullage vessel.

Preferably, the ullage vessel is positioned towards the top of the second tank when the tank assembly is its in use position.

On filling the inner tank with a cryogenic liquid, the liquid entering the second, inner tank will not be able to enter the ullage chamber until the liquid level reaches the lower face of the ullage vessel. For this reason the ullage vessel is positioned at an in use high position within the inner tank. When the liquid reaches the lower face of the ullage vessel the liquid will begin to enter the vessel at a rate determined by the diameter of the second aperture. This is because the rate at which liquid may enter the ullage vessel is determined by the rate at which vapour may exit the ullage vessel, which rate is determined by the diameter of the second aperture. Once the volume of the inner tank, not including the volume of the ullage vessel, is full, an indicator may indicate to a user that the tank is full, and that the user should therefore discontinue filling the tank.

Conveniently, the ullage vessel comprises a plurality of first apertures and a plurality of second apertures.

Advantageously, the storage tank assembly comprises a plurality of ullage vessels, more preferably two ullage vessels.

Conveniently, the or each ullage vessel has a substantially oval cross-section. This allows the volume within the inner tank to be maximised.

Advantageously, the storage tank assembly further comprises an indicator for indicating that the inner tank is full of cryogenic liquid.

After filling has discontinued, the cryogenic liquid may continue to enter the ullage vessel at a rate determined by the diameter of the second aperture(s). As the cryogenic liquid enters the second tank, a void is created in the inner tank. This void may be used to allow expansion of the cryogenic liquid if, for example, the temperature within the second, inner tank increases causing the cryogenic liquid to expand. This helps prevents the pressure within the second tank increasing beyond safe levels in the event that the temperature within the second tank increases thus causing expansion of the cryogenic liquid.

Preferably, the storage tank assembly further comprises a support for supporting the first tank within the second tank.

Conveniently, the support comprises a support membrane extending between an end of the second tank and a corresponding end of the first tank. In other words, each of the elongate support members is in contact with the first tank only at either end of the first tank. This reduces contact between parts of the storage tank assembly, thus reducing the possibility of cold tracking.

Advantageously, the storage tank assembly comprises a plurality of elongate support members extending along the length of the first tank, the second tank being supported by the plurality of support members.

Preferably, the or each elongate support member is attachable to the first tank at the ends of the first tank.

Advantageously, the or each elongate support member is also attached to the second tank, preferably to a middle portion of the second tank.

Advantageously, the insulation space between the first and second tanks comprises a vacuum.

According to a second aspect of the present invention there is provided a storage tank assembly for the storage of cryogenic liquids comprising a first outer tank and a second inner tank, the first and second tanks being spaced apart from one another to form an insulation space, the storage tank assembly further comprising an ullage vessel contained within the second tank and comprising a first aperture and an opposite second aperture, whereby, in use, the first aperture is located below the second aperture, and is larger than the second aperture.

The storage tank assembly according to the second aspect of the present invention may, in preferred and advantageous embodiments, have some or all of the features described hereinabove with reference to the storage tank according to the first aspect of the present invention.

According to a third aspect of the present invention there is provided a storage tank assembly for the storage of cryogenic liquids comprising a first outer tank and a second, inner tank, the first and second tanks being spaced apart from one another to form an insulation space, the storage tank assembly further comprising a support for supporting the first tank within the second tank.

The storage tank assembly according to the third aspect of the present invention may, in preferred and advantageous embodiments, have some or all of the features described hereinabove with reference to the storage tank according to the first aspect of the present invention.

According to a fourth aspect of the present invention there is provided a storage tank assembly for the storage of cryogenic liquids comprising a first outer tank and a second inner tank, the first and second tanks being spaced apart from one another to form an insulation space, the storage tank assembly further comprising a cryogenic liquid delivery system comprising the eductor.

The storage tank assembly according to the fourth aspect of the present invention may, in preferred and advantageous embodiments, have some or all of the features described hereinabove with reference to the storage tank according to the first aspect of the present invention.

Preferably, the first and second tanks forming a storage tank assembly according to any of the first, second, third or fourth aspects of present invention are each substantially circular in cross-section and each has a first end, and an opposite second end spaced apart from the first end, and a wall extending from the first end to the second end, and having a curved surface. Each of the first and second tanks is therefore substantially cylindrical in shape.

DESCRIPTION OF THE DRAWINGS

The invention will now be further described by way of example only with reference to the accompanying drawings in which:

FIG. 3 is a schematic representation of the cryogenic storage tank assembly of FIG. 2 according to an embodiment of the present invention;

FIG. 4 is a cross-sectional representation of the storage tank assembly of FIG. 3;

FIG. 7 is a schematic representation of an embodiment of a support for supporting the inner tank forming part of the assembly shown in FIG. 3; and FIG. 8 is an alternative embodiment of a support for supporting the inner tank of the assembly shown in FIG. 3.

DETAILED DESCRIPTION

Figure 1:
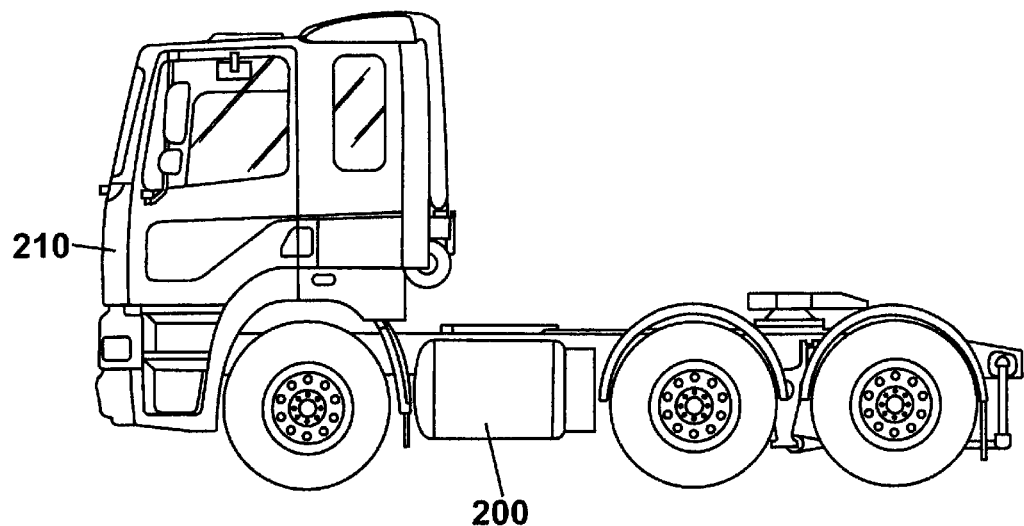
FIG. 1 is a schematic representation showing an existing cryogenic storage tank mounted on a vehicle.
Figure 2:
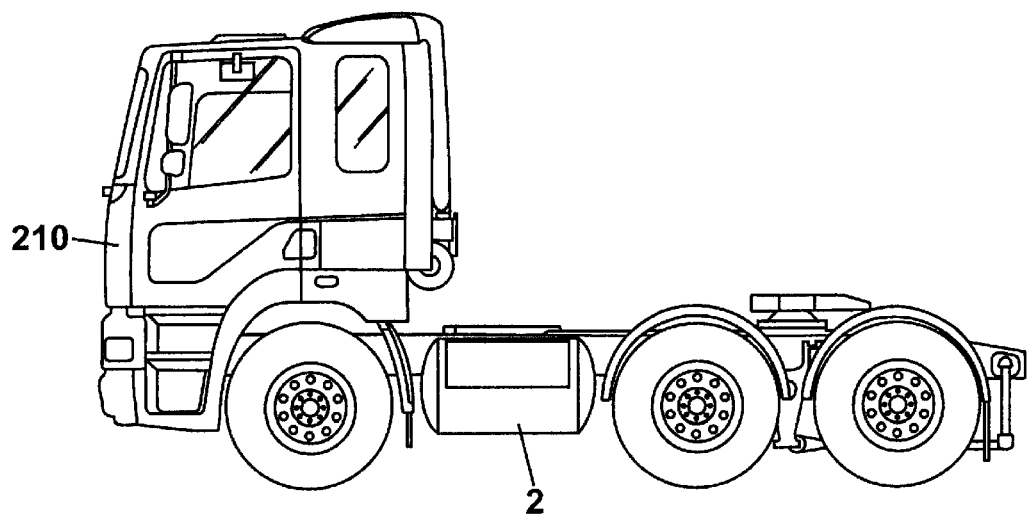
FIG. 2 is a schematic representation showing a cryogenic storage tank according to an embodiment of the present invention mounted on a vehicle.

Referring initially to FIG. 1 an existing cryogenic storage tank assembly 200 is shown mounted on a vehicle 210. The known cryogenic storage tank assembly 200 is mounted horizontally in order to make most effective use of the space available between two wheels 220 of the vehicle 210. However, the known cryogenic storage tank assembly comprises a tank which is designed to be mounted vertically. Because the tank 200 is mounted horizontally, it suffers from the disadvantages described hereinabove, particularly with respect to access to the controls of the tank.

Referring now to the FIGS. 2 to 12, a storage tank assembly for storing cryogenic liquids according to the embodiment of the invention is illustrated generally by the reference numeral 2. The storage tank assembly 2 comprises a first, outer tank 4 and a second, inner tank 6. The first and second tanks 4, 6 are spaced apart from one another to form an insulation space 8 which may be in the form of, for example a vacuum filled with insulating material such as multi-layered fibre insulation or perlite.

The first outer tank comprises a first end 10, an opposite second end 12 and a wall 14 extending between the ends 10, 12. Similarly, the second tank 6 comprises a first end 16, a second, opposite end 18 spaced apart from the first end 16, and a wall 20 extending between the two ends, 16, 18.

Each of the tanks is substantially circular in cross-section and therefore is substantially cylindrical in shape.

The tanks are positioned relative to one another such that they are substantially co-axial. In use, the axes of the first and second tanks 4, 6 will extend substantially horizontally.

Contained within the second tank 6 are two ullage vessels 22, each comprising an upper face 24 and a lower face 26. Each vessel 22 comprises a plurality of first apertures 28 extending through lower face 26, and a single second aperture 30 extending through an upper face of a respective ullage vessel 22. In other embodiments there may be a single first aperture and/or a plurality of second apertures. The second aperture 30 of each ullage vessel 22 is smaller in diameter than the each of the first apertures 28 of the respective ullage vessel 22.

Figure 5:
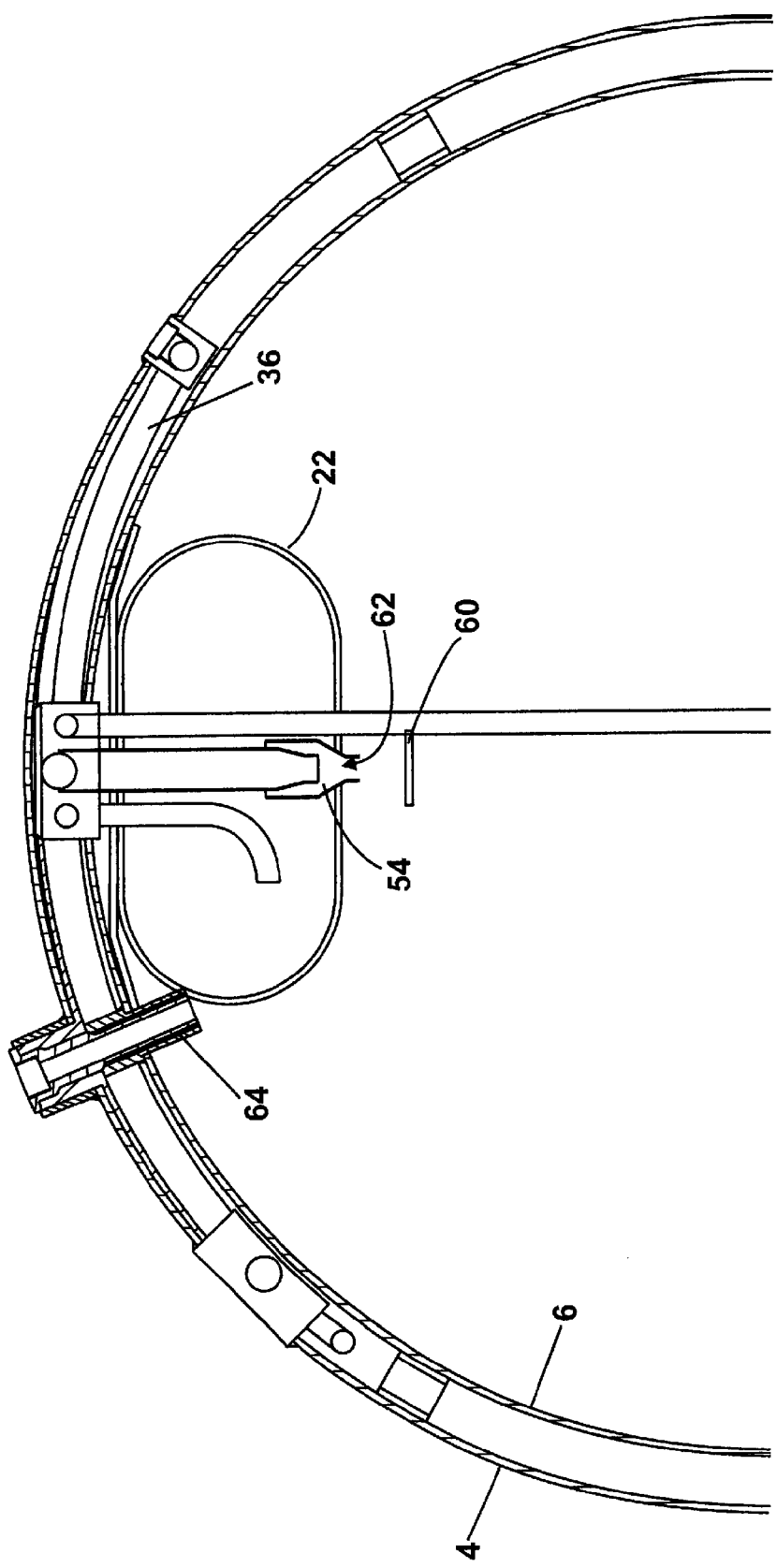
FIG. 5 is a partial more detailed cross-sectional representation of the storage tank of FIG. 3.

Referring particularly to FIGS. 4 and 5, it can be seen that each ullage vessel 22 in this embodiment has a substantially oval cross-section. This allows the volume of each vessel 22 be maximised.

The two ullage vessels 22 are positioned such that when the tank is mounted horizontally i.e., with the axes of the tanks 4, 6 extending substantially horizontally, the ullage vessels 22 are positioned as high up within the inner storage tank, and as close to the apex of the inner storage tank as possible.

Each ullage tank 22 is mounted on the wall 20 of the second tank 6 by any suitable means, for example by a bracket 25.

The apertures 28, 30 of each ullage vessel 22 act as breathing holes. The second aperture 30 which has a smaller diameter than each of the first apertures 28, controls the rate at which liquid may enter or drain out of a respective ullage tank 22. The first apertures 28 of each ullage vessel 22 allow for faster pressure equalisation between each ullage vessel 22 and the inner tank 6.

The storage tank assembly 2 further comprises a plurality of pipes 32 comprising a first pipe work system 34 which is mounted externally of the first tank 4, and a second pipe work system 36 which is mounted between the first tank 4 and the second tank 6 and is thus located within the insulation space 8.

The first pipe work system 34 is connectable to a first connector 38, which, in this embodiment is in the form of a boss 40 (or manifold) which is fixed to connector portion 42 which extends through the wall 14 of the first tank 4. Because the first connector 38 is fixed to the wall 14 of the first tank 4, the storage tank assembly 2 may be mounted on either side of a vehicle as desired. This is because the storage tank assembly 2 may be positioned such that the connector 38 is always mounted on a portion of the wall facing outwardly from the vehicle on which it is mounted thus allowing access to the first pipe work system 34 connected thereto.

Once the first pipe work system 34 has been connected to the first connector 38 it is positioned to lie over, and to be spaced apart from the wall 14 of the first tank 4.

In the illustrated embodiment, the first pipe work system 34 is fixed to boss 40 which in turn is bolted to the connector portion 42

The storage tank assembly 2 comprises one or more second connectors 44 which are fixed to, and extend through, the wall 20 of the second tank 6. The second pipe work system 36 is connectable to one or more first connectors 38 and to one or more second connectors 44 such that there is fluid communication between the first pipe work system 34 and the second pipe work system 36 via the one or more first and second connectors 38, 42, 44 thus allowing the inner tank 4 to be fluidly connected to external supplies.

Each of the second connectors 44 is in the form of bosses which are shaped to fit between the first and second tanks 4, 6 such that there is minimum, or no, contact between the second pipe work system 40 and either wall 14 or wall 20.

Since the pipe systems 34, 42 do not make contact with the tanks 4, 6 except via the first connector(s) 38 and the second connector(s) 44, cold tracking is minimised. In addition, flexibility and tolerance of assembly are provided since the pipe work subsystems 34, 42 may be preassembled and then connected to first and second connectors 38, 44.

Figure 6:
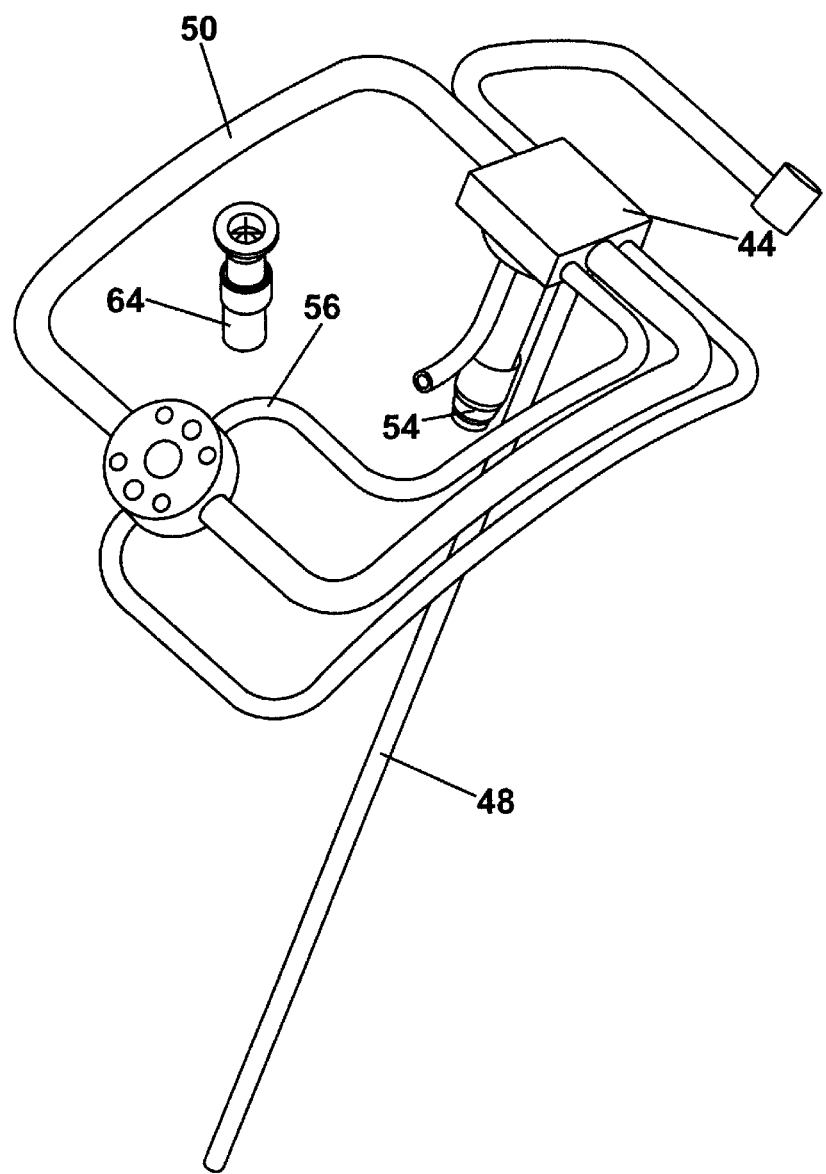
FIG. 6 is a schematic representation of part of the pipe work forming the embodiment of the assembly shown in FIG. 3.

The second pipe work system 36 is shown in more detail in FIG. 6. The pipes forming the second pipe work system 36 are generally to allow for liquid fill, liquid withdrawal, vapour return/withdrawal, over pressure protection and for connection of a level gauge.

As shown in FIG. 6, the second pipe work system 36 comprises pipes 46 connected to a liquid withdrawal line 48, liquid fill lines 50 and 52 connected to an eductor 54 for filling the tank 6, and pipe 56 connected to a second connector 44. A pressure relief device 58 is also connected to second connector 44. The second pipework system 36 is also connected to connector portion 42 forming part of a first connector 38, thus allowing the second pipework system to be connected to the first pipework system and then to external devices.

Liquid withdrawal line 48 is positioned substantially centrally within the inner tank 6 as shown in FIG. 5. The liquid fill lines 50 and 52 have associated therewith eductor 54. The eductor entrains cryogenic vapour during filling of the inner tank 6 with cryogenic liquid. The entrained vapour mixes and collapses into the colder incoming liquid thus condensing the vapour pressure inside the inner tank 6.

Liquid exiting the eductor 54 impinges on a dispersing device 60 in the form of a deflector plate or spray disc. The dispersing device 60 causes a spray to be formed which also enhances the vapour condensation process.

Condensation of vapour formed during filling of the tank with cryogenic liquid reduces the pressure within the inner tank 6 and thus improves the liquid filling process.

The storage tank assembly 2 further comprises a level indicator 64 indicating that the vessel is filled to a safe level. The level indicator is designed to be replaceable in the event of a failure of the device.

The level of fill of liquid entering the tank 6 is also controlled by the ullage vessels 22 as has been described hereinabove. The storage tank assembly 2 further comprises a manual vapour vent pipe 66 to assist in the liquid fill process, and to reduce vapour pressure when necessary. The manual vapour vent pipe 66 is positioned inside the second tank 6 at a position that is in use, higher than the apertures 30 of the ullage vessels 22 and eductor 54. Manual vapour outlet pipe 66 acts as a tricock to manage the maximum fill level of the liquid as a means of indicating maximum liquid level in the event of the failure of the liquid level device.

The inner tank 6 is supported within the outer tank 4 by means of a support 70.

In the embodiment shown in FIG. 7, the support 70 comprises a diaphragm 72. The diaphragm is a so-called spider shaped diaphragm wherein a centre portion 72 is attachable to a central portion of an end 16, 18 of the second tank 6. An outer portion 72 of the diaphragm may be fixed to an inner surface of an end 10, 12 of the first tank 4.

The storage tank assembly 2 comprises two such diaphragms 72 positioned at either end of the assembly 2.

The support further comprises a plurality of struts 74. Generally there will be three or four such struts 74. The struts extend along the length of the first tank 4 and are connected to each end of the tank 4. In addition, they are fixed to a central portion of the inner tank 6 on wall 20. The struts 74 are spaced apart substantially equally around the inner tank 4 and outer tank 6.

Turning now to FIG. 8 a second embodiment of a support is illustrated. The support 80 in this embodiment comprises struts 82 which are similar to struts 74 described hereinabove with reference to the embodiment shown in FIG. 7. The support comprises a first cylindrical sleeve 84 fixed centrally to end 10 of the outer tank 4, and a second smaller cylindrical sleeve 86 fixed to end 16 of the inner tank 6. A low friction cylindrical sliding thermal breaker 88 is positioned between the sleeves 84, 86. A thermal brake sleeve is provided to minimise cold tracking. The sliding support is sufficiently large to minimise stress imposed in the end shell of the vessels. A second pair of sleeves 84, 86 is fixed to ends 12, 18 respectively.

What is claimed is:

1. A storage tank assembly for the storage of cryogenic liquids comprising a first outer tank and a second inner tank, the first and second tanks being spaced apart from one another to form an insulation space, the storage tank assembly further comprising a cryogenic liquid delivery system comprising an eductor located within the second inner tank so as to entrain cryogenic vapour during filling of the inner tank with cryogenic fluid, wherein the storage tank assembly further comprises an ullage vessel contained within the second tank and comprising a first aperture and an opposite second aperture, whereby, in use, the first aperture is located below the second aperture, and is larger than the second aperture, wherein the ullage vessel has an upper face and a lower face with the upper face thereof in facing relationship to a top wall defining the second inner tank, and at least said second aperture is comprised of a breathing hole that is open to an interior of the second inner tank and wherein the eductor is positioned outside the ullage vessel and is operatively isolated therefrom.

2. A storage tank assembly according to claim 1 wherein each of said first and second apertures is comprised of a breathing hole that is open to the interior of the second inner tank.

3. A storage tank assembly according to claim 2 wherein the second aperture, which has a smaller size than the first aperture, controls the rate at which liquid enters or drains out of the ullage tank, and the first aperture of the ullage vessel allows for faster pressure equalisation between the ullage vessel and the inner tank.

4. A storage tank assembly according to claim 1 wherein each of the first and second tanks has a first end, and an opposite second end spaced apart from the first end, and a wall extending from the first end to the second end.

5. A storage tank assembly according to claim 4 further comprising a first connector extending through the wall of the first tank for allowing connection of pipes to the tank assembly.

6. A storage tank assembly according to claim 5 comprising a plurality of pipes connectable directly or indirectly to the first connector, the plurality of pipes comprising a first pipe work system connectable to the first connector such that the first pipe work system is spaced apart from an outer surface of the wall of the first tank, and a second pipe work system connectable to the first connector such that the second pipework system is located in the insulating space, and spaced apart from an inner surface of the wall of the first tank, and an outer surface of the wall of the second tank.

7. A storage tank assembly according to claim 6 further comprising a second connector extending through the wall of the second tank, the second pipe work system being connectable to the second connector, and to the first connector.

8. A storage tank assembly according to claim 1 wherein the ullage vessel is a separate self-contained vessel that is disposed within but supported from the second inner tank.

9. A storage tank assembly according to claim 8 wherein all walls forming the ullage vessel are separate from any wall defining the second inner tank.

10. A storage tank assembly according to claim 8 wherein the ullage vessel is positioned so that when the storage tank assembly is mounted horizontally, the entire ullage vessel is disposed above a horizontal center axis of the tanks.

11. A storage tank assembly according to claim 10 wherein the lower face of the ullage vessel is disposed a greater distance from the horizontal center axis than the space defined between the upper face of the ullage vessel and an inner surface of the inner tank wall.

12. A storage tank assembly according to claim 11 wherein the ullage vessel is positioned high up in the inner tank with the upper face of the ullage vessel being disposed spaced from but as close as possible to an apex of the inner tank.

13. A storage tank assembly according to claim 1 including bracket means for mounting the upper face of the ullage vessel to the tank wall.

14. A storage tank assembly according to claim 1 including a pair of ullage vessels that are disposed along a common axis and that are spaced apart with the educator spaced from each of the ullage vessels but disposed therebetween.

15. A storage tank assembly according to claim 1 including a first pipe work system mounted externally of the outer tank and a second pipe work system that is mounted within the insulation space between the tanks.

16. A storage tank assembly according to claim 15 wherein the second pipe work system includes a pipe for supporting the educator that extends downwardly from a support connector.

17. A storage tank assembly according to claim 16 including a dispersing plate device mounted below the educator for causing a spray to be formed for enhancing vapour condensation.

18. A storage tank assembly according to claim 1 including a plurality of first apertures extending through the lower face.

19. A storage tank assembly according to claim 18 including only a single second aperture extending through the upper face.

20. A storage tank assembly according to claim 1 including a first connector extending through the wall of the outer tank for allowing connection of pipes to the tank assembly, and further comprising a plurality of pipes connectable directly or indirectly to the first connector, the plurality of pipes comprising a first pipe work system connectable to the first connector such that the first pipe work system is spaced apart from an outer surface of the wall of the first tank, and a second pipe work system connectable to the first connector such that the second pipework system is located in the insulating space, and spaced apart from an inner surface of the wall of the first tank, and an outer surface of the wall of the second tank.

\* \* \* \* \*